United States Patent Office 3,341,492
Patented Sept. 12, 1967

3,341,492
POLYAMIDES STABILIZED WITH IODINE AND/OR BROMINE SUBSTITUTED PHENOLS
Antony E. Champ, Scotch Plains, and Henry W. Steinmann, Lake Mohawk, N.J., assignors to Celanese Corporation, a corporation of Delaware
No Drawing. Filed May 11, 1964, Ser. No. 366,652
8 Claims. (Cl. 260—45.95)

This invention relates to synthetic linear polyamides which are stabilized against degradative effects of heat, oxygen, and atmospheric conditions and to the manufacture of said polyamides.

Synthetic linear polyamides when exposed to the atmosphere at elevated temperatures for fairly long periods of time undergo degradation which impairs those physical properties responsible for the toughness, strength and flexibility characteristics of such substances. In addition, these polyamides are badly discolored by exposure to atmospheric conditions, i.e. heat and light. The resulting brittleness and discoloration are undesirable to certain applications such as electrical insulation, transparent films, bristles, cloth, coated fabrics and the like, wherein much dependence is placed upon maximum retention of toughness, strength, flexibility and original color during fabrication and service.

Numerous stabilizers are known which are said to obviate the embrittlement of the polyamides at elevated temperatures in the presence of oxygen. As examples, satisfactory effects have been obtained by incorporating in the molecule copper salts (French Patent 906,893, British Patent 652,947); halogenides (East German Patent 5350); certain acids of phosphorus (U.S. Patent 2,510,777); or mixtures of the substances named above (British Patent 722,724, U.S. Patent 2,705,227). It has been further suggested to incorporate organic heat stabilizers in the polyamide molecules, e.g. amines (Dutch Patent 56,665), mercaptobenzimidazole (U.S. Patent 2,630,421), or a combination of a copper salt and a hydrohalogenic acid salt of an aryl amine, aliphatic amine and the like U.S. Patent 2,960,489).

It is the object of this invention to provide a high molecular weight synthetic linear polyamide stabilized against degradative effects of heat, oxygen and atmospheric conditions utilizing a unique class of stabilizers. It is a further object of the invention to provide a process for stabilizing high molecular weight synthetic linear polyamides against heat degradation or embrittlement that is encountered upon exposure for prolonged periods of time to elevated temperatures, particularly under atmospheric conditions. These and other objects will become apparent to those skilled in the art from the description of the specification and appended claims.

The objects of this invention are accomplished by incorporating into a synthetic linear polyamide, a stabilizer composition comprising an arylene radical to which is attached at least one hydroxyl group and at least one atom of iodine or bromine. Where more than one halogen atom is present in the stabilizing composition, both iodine and bromine atoms can be present. Suitable stabilizer compositions can include among others, 1-iodo-2,3,5-trihydroxybenzene, 1-iodo-3,5-dihydroxybenzene, 2-bromo-1,3,5-trihydroxybenzene, 1-bromo-3,5-dihydroxybenzene and the like, as well as the preferred compositions described hereinafter.

The synthetic linear polyamides which are utilized herein are well known in the art and can be prepared from polymerizable mono-amino-carboxylic acids; their amide-forming derivatives, or from suitable diamines and suitable dicarboxylic acids or amide-forming derivatives of these compounds. The polyamides produced have recurring amide groups as an integral part of the main polymer chain and the recurring intra-linear carbonamide groups in these polyamides are separated by hydrocarbon groups containing at least two carbon atoms. Synthetic linear polyamides which can be stabilized according to the process of this invention are all those of the nylon type having an intrinsic viscosity above 0.2, preferably above 0.4. Preparation of such polymers is typically illustrated in U.S. Patents 2,071,200; 2,071,253; 2,130,948; 2,285,009 and 2,512,606, among others. Particular polyamides included among these which can be stabilized by the stabilizers of this invention include among others, polyhexamethylene adipamide, polyhexamethylene sebacamide, polymerized 6-aminocaproic acid, polytetramethylene sebacamide, polytetramethylene adipamide and polyadipamides prepared from di(4-aminocyclohexyl) ethane or 1,6-di(4-aminocyclohexyl) hexane as the diamine component.

The time of addition of the stabilizer compositions to the polyamides is not necessarily critical. The stabilizer compositions as used herein are added preferably to the polyamide salt prior to the condensation reaction. These stabilizer compositions can be added to the reactants during the condensation reaction and the addition can also be made to the molten polymer after the condensation reaction is complete.

The manner of preparing the polyamides for the condensation reaction is well known in the art. A typical procedure which can be followed includes the addition of typical reactants such as hexamethylene diammonium adipate, and water in the presence of p-iodophenol, acetic acid and cupric acetate to a pressure reactor vessel. The reaction vessel is flushed with nitrogen. The reaction solution is heated to approximately 140° C. allowing approximately one-quarter of the water to be distilled from the mixture. The reactor is then closed off and heated until a pressure of from 225–275 pounds per square inch was obtained. The desired pressure such as 250 pounds per square inch was maintained by slight bleeding until the temperature of the mixture reached approximately 200 to 270° C. When the desired temperature was reached, all of the pressure was released slowly and nitrogen was passed over the melt for a sufficient period of time to obtain the desired intrinsic viscosity of the polymer product.

The preferred class of stabilizer composition which is used herein has the following generic formula:

HO-Ar-(X)

wherein Ar represents an aromatic radical, X represents iodine and bromine and n represents an integer from 1 to 5. The term "aromatic" as used herein is defined as the benzene radical or derivatives thereof such as, alkyl benzenes, naphthalene, alkyl naphthalene, anthracene, alkyl anthracene, and the like. The more preferred stabilizers of this invention fall within a subgeneric class of compounds having the formula:

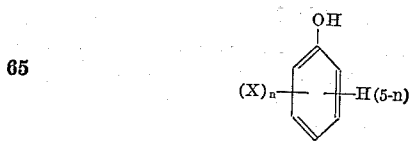

wherein X represents iodine and bromine and $n$ represents a integer from 1 to 5. Suitable compounds falling within the preferred generic and subgeneric classes described above, include among others; p-iodophenol, metaiodophenol, ortho-iodopenol, 3,5-diiodophenol, 3,6-diiodophenol, 2,4,6-triiodophenol, 3-bromo-5-iodophenol, 2-bromo-4-iodophenol, 3-bromo-2,6-diiodophenol, and the like. Of the above-described compounds, the most preferred compounds are para-iodophenol and 2,4,6-triiodophenol.

The amounts of the composition as described hereinbefore which can be used to stabilize the synthetic linear polyamide are used in stabilizing quantities and can range from about 0.10 percent to about 5 percent by weight, or higher, if desired, preferably in the range from about 0.20 percent to about 2 percent by weight based on the total polyamide composition. The unusual feature of the stabilizer composition of this invention is that a copper compound is not really necessary in the stabilization of the synthetic linear polyamides.

The compositions of this invention may be modified by the addition of other materials. Suitable modifying agents include plasticizers, resins, waxes, fillers and certain pigments. The form and use of the polyamide will determine which of these modifying agents are the more suitable.

The improved polyamides of this invention can be converted into any of the forms suitable for polyamides generally, such as yarns, tire cord, bristles, fabric, molded articles, films, and coatings, for example, for filaments, textiles, wood, rubber, leather, and ceramic materials, and are particularly useful in the above forms when intended to be exposed to elevated temperatures. Thus, they form especially valuable textile fabrics by reasons of their stability toward the high temperatures encountered in laundering, calendering and ironing operations. By reason of their excellent durability, the compositions of the invention are especially useful, also, for electrical insulation, for example as coating for magnet wires, electric blasting cap leading wires, and slot insulation for motors, movie film, sausage casing, and as coatings on materials which are exposed to elevated temperatures.

The following examples will serve to illustrate the process of the invention without limiting the same:

*Example 1*

Into a small pipe autoclave was charged a solution containing 40 grams of hexamethylene diammonium adipate, 0.35 gram of p-iodophenol and 55 milliliters of water. The autoclave was flushed with nitrogen, then sealed and heated. At approximately 140° C. and 35 pounds per square inch, 30 milliliters of water were removed slowly. The autoclave was again sealed and heating continued until a pressure of 250 pounds per square inch was obtained. The pressure was then slowly released until atmospheric pressure was attained. The material was then heated to a temperature greater than 264° C. and held at this temperature with nitrogen flowing over the melt for about two hours. At the end of this period the reactor was closed, pressured to about 50 pounds per square inch with nitrogen and the resultant polymer extruded through an appropriate valve in the base of the autoclave. The polymer had a relative viscosity of 2.4

The polymer thus obtained in the form of wire was exposed at 162° C. in an air oven. This material was still flexible after 120 hours exposure, whereas unstabilized polyhexamethylene adipamide was brittle after 65 hours.

*Example 2*

Into the same equipment as used in Example 1 was charged 60 grams of hexamethylene diammonium adipate, 0.520 gram of 2,4,6-triiodophenol and 55 milliliters of water. The method of polymerization was similar to the above, however, only 115 pounds per square inch pressure were obtained and ½ hour of vacuum replaced 1¾ hours of nitrogen sweep. The polymer had a relative viscosity of 2.0.

This material, tested in a manner identical to Example 1, was still flexible after 171 hours exposure at 162° C.

In a similar manner as described in Examples 1 and 2 above, the following compounds; namely, meta-iodophenol, 3,6-diiodophenol, 2-bromo-4-iodophenol, 1-iodo-2,3,5-trihydroxybenzene, are utilized as stabilizer compositions in polyhexamethylene adipamide polymer. The results of the flexibility test of various polymers were similar to those of Examples 1 and 2.

It is to be understood that the foregoing description is merely illustrative of preferred embodiments of the invention of which many variations may be made by those skilled in the art within the scope of the following claims without departing from the spirit thereof.

What is claimed is:

1. A synthetic linear polyamide having recurring amide groups as an integral part of the main polymer chain and the recurring intra-linear carbonamide groups in these polyamides being separated by hydrocarbon groups containing at least two carbon atoms which is stabilized against degradative effects of heat, oxygen, and atmospheric conditions having incorporated therein stabilizing quantities of a stabilizer composition comprising an arylene radical to which is attached at least one hydroxyl group and at least one halogen atom selected from the group consisting of iodine and bromine.

2. A synthetic linear polyamide having recurring amide groups as an integral part of the main polymer chain and the recurring intra-linear carbonamide groups in these polyamides being separated by hydrocarbon groups containing at least two carbon atoms which is stabilized against degradative effects of heat, oxygen and atmospheric conditions having incorporated therein stabilizing quantities of a stabilizer compound having the formula:

$$HO\text{-}Ar\text{-}(X)_n$$

wherein Ar represents an aromatic radical, X represents iodine and bromine and $n$ represents an integer from 1 to 5.

3. The composition of claim 1 wherein the stabilizing quantities range from about 0.10 percent to about 5 percent by weight.

4. A synthetic linear polyamide having recurring amide groups as an integral part of the main polymer chain and the recurring intra-linear carbonamide groups in these polyamides being separated by hydrocarbon groups containing at least two carbon atoms which is stabilized against degradative effects of heat, oxygen, and atmospheric conditions having incorporated therein about 0.20 percent to about 2 percent by weight of a stabilizer compound having the formula:

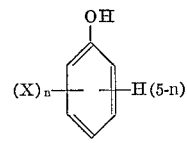

wherein X represents iodine and bromine and $n$ represents an integer from 1 to 5.

5. The composition of claim 4 wherein the stabilizer compound is p-iodophenol.

6. The composition of claim 4 wherein the stabilizer compound is 2,4,6-triiodophenol.

7. The composition of claim 4 wherein the polyamide is polyhexamethylene adipamide and the stabilizer compound is p-iodophenol.

8. The compound of claim 4 wherein the polyamide is polyhexamethylene adipamide and the stabilizer compound is 2,4,6-triiodophenol.

(References on following page)

References Cited

UNITED STATES PATENTS

| | | |
|---|---|---|
| 2,630,421 | 3/1953 | Stamatoff _____ 45.95 |
| 2,705,227 | 3/1955 | Stamatoff _____ 45.95 |
| 2,960,489 | 11/1960 | Gabler et al. _____ 45.95 |
| 3,182,089 | 5/1965 | Wilbert _____ 45.95 |
| 3,274,150 | 9/1966 | Baevsky _____ 45.95 |
| 3,282,892 | 11/1966 | Griehl _____ 45.95 |
| 3,290,250 | 12/1966 | Orloff et al. _____ 45.95 |
| 3,294,735 | 12/1966 | Twilley et al. _____ 45.95 |

FOREIGN PATENTS

| | | |
|---|---|---|
| 38/16,770 | 9/1963 | Japan. |

DONALD E. CZAJA, *Primary Examiner.*

R. A. WHITE, *Assistant Examiner.*